(12) United States Patent
Cattaneo

(10) Patent No.: US 11,103,065 B1
(45) Date of Patent: Aug. 31, 2021

(54) JOINING AND LEVELLING SYSTEM FOR PARTS OF FURNITURE AND FURNISHING ITEMS

(71) Applicant: Leonardo S.r.l., Figino Serenza (IT)

(72) Inventor: Carlo Cattaneo, Figino Serenza (IT)

(*) Notice: Subject to any disclaimer, the term of this patent is extended or adjusted under 35 U.S.C. 154(b) by 0 days.

(21) Appl. No.: 17/250,233

(22) PCT Filed: May 31, 2019

(86) PCT No.: PCT/IB2019/054529
§ 371 (c)(1),
(2) Date: Dec. 21, 2020

(87) PCT Pub. No.: WO2020/016670
PCT Pub. Date: Jan. 23, 2020

(30) Foreign Application Priority Data

Jul. 20, 2018 (IT) ........................ 102018000007388

(51) Int. Cl.
*A47B 91/02* (2006.01)
*A47B 91/00* (2006.01)

(52) U.S. Cl.
CPC .......... *A47B 91/022* (2013.01); *A47B 91/005* (2013.01)

(58) Field of Classification Search
CPC combination set(s) only.
See application file for complete search history.

(56) References Cited

U.S. PATENT DOCUMENTS

| 5,913,498 | A | * | 6/1999 | Brown | ................. A47B 91/024 248/188.8 |
| 6,070,840 | A | * | 6/2000 | Kelley | ..................... A47B 9/04 248/188.2 |
| 11,013,324 | B2 | * | 5/2021 | Cattaneo | ............. A47B 91/028 |
| 2019/0003505 | A1 | * | 1/2019 | Cattaneo | ............. A47B 91/028 |

FOREIGN PATENT DOCUMENTS

| EP | 3267050 | 1/2018 |
| WO | 2017153175 | 9/2017 |
| WO | 2018007237 | 1/2018 |

* cited by examiner

*Primary Examiner* — Monica E Millner
(74) *Attorney, Agent, or Firm* — Themis Law

(57) ABSTRACT

A joining and leveling system for parts of furniture and furnishing items having a bottom or base and a shoulder includes, in combination, a front foot unit and a rear foot unit, wherein each of the front and rear foot units includes a maneuverable connection group with a constraining element and a leveling group with a height adjustment mechanism, wherein both the maneuverable connection group and the leveling group of the front foot and the rear foot unit can be actuated from the front with respect to the furniture through the space between the bottom or base and the floor, and wherein the connection group and the leveling group of the rear foot unit can be actuated from the front using actuation or transmission rods, of which a front end is positioned adjacent to actuation holes of the connection group and the leveling group of the front foot unit.

7 Claims, 1 Drawing Sheet

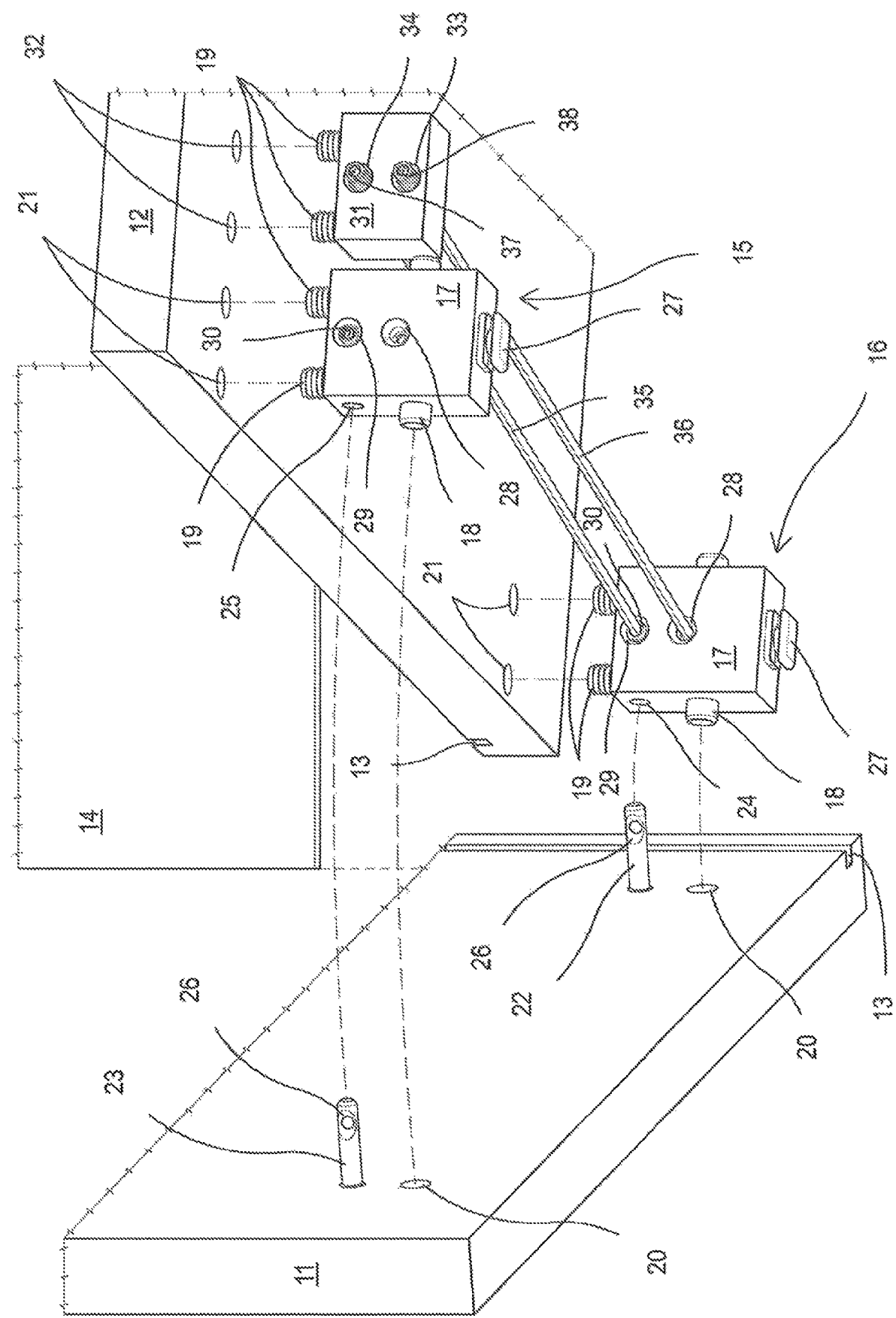

JOINING AND LEVELLING SYSTEM FOR PARTS OF FURNITURE AND FURNISHING ITEMS

The present invention relates to a joining and levelling system for parts of furniture and furnishing items.

Joining and levelling system for parts of furniture and furnishing items are known, which involve the production of a series of visible holes and spaces destined for actuating the joints. Furthermore, these known systems must have a certain amount of free space under the furniture for adjusting both the rear feet of the furniture and the rear joints.

In other solutions, separate devices for effecting joining and levelling have been known for some time, or holes must be provided either visible or in any case that can only be covered with caps, which do not allow the formation of smooth surfaces free of obstacles or perforations.

Finally, actuation from above, in particular for rear joints and levellers, is not always easy, in the presence of limited space between shelves and or minimum distances from the furniture bottom or rear wall of the furniture.

The general objective of the present invention is to provide a joining and levelling system for parts of furniture and furnishing items which solves the problems and drawbacks indicated above.

A further objective of the present invention is to provide a joining and levelling system for parts of furniture and furnishing items which allows a front connection and adjustment, also for the rear joints and levelling feet.

Another objective of the present invention is to provide a joining and levelling system for parts of furniture and furnishing items which is accessible also when said pieces of furniture have a space beneath the bottom that is extremely limited and with serious difficulties of access.

The above objectives are achieved by a system having the characteristics indicated in the enclosed claim 1 and subordinate claims.

The structural and functional characteristics of the invention, and its advantages with respect to the known art, can be clearly understood from the following description, referring to the enclosed drawing, which illustrates a perspective view with exploded parts of an example of a joining and levelling system for parts of furniture and furnishing items prepared conceived for joining a shoulder and base or bottom of a piece of furniture.

With reference to the FIGURE, the same shows part of a piece of furniture, wherein shoulders 11 are provided in the form of side walls (only one of which is shown) which may or may not end in correspondence with a bottom or base 12, i.e. which may or may not reach the floor (not shown), closed at the rear by a lining 14, of which the shoulder 11 and the base 12 carry housing seats 13.

As can be easily understood, in furniture arrangements of this kind, the space below the base 12 must be completely free and the front access to the rear adjustable feet can be extremely difficult due to the small distance between the floor and the base 12 of the furniture.

As is evident from the FIGURE, front and rear feet are positioned close to corners or edges of the base 12.

The FIGURE shows, as an example, how a joining and levelling system for parts of furniture and furnishing items is fixed at the base 12, comprising at least one front foot unit 15 and one rear foot unit 16. It can be easily seen how both the front 15 and rear 16 units incorporate joining and levelling devices for furniture and furnishing items.

A front foot 15 or rear foot 16 units of the system comprises a body 17, for example prismatic, which can be respectively associated, by means of at least one interlocking plug 18 and at least one snap plug (so called "double") or press-fit plug 19 (in the example two), with a hole 20 of a shoulder 11 and a pair of holes 21 of the base 12.

The FIGURE also shows that pins 22,23 extend from the shoulder 11, which are housed in the holes 24,25 of the body 17 of the units 16,15. The pins 22,23 provide, in their protruding part, a housing 26 for the tip of a blocking grub screw 30 or similar constraining elements (not shown) screwed into a threaded hole inside the body 17, obtained in a direction perpendicular to the holes 22,23 to cross with them.

Each of the pins 22,23 define a connection group for interconnecting and firmly blocking the shoulder 11 and the base 12, defining blocking means together with the blocking grub screws 30 or similar constraining elements (not shown).

Furthermore, it should be taken into account that the body 17 of the front foot 15 or rear foot 16 units of the system centrally has a seat for a levelling group of which a foot 27 beneath the body 17 can be observed.

The blocking grub screws 30 or similar constraining elements and the feet 27 can be actuated in front of the furniture or at the shoulder 11 and at the base 12.

In the example shown, the body 17 of the front foot 15 or rear 16 units of the system provides a pair of overlapping holes 28,29 positioned one above the other.

The first hole 29, higher than the other hole 28, is the one from which it is possible to act on the blocking grub screw 30 or similar constraining elements for blocking the body 17 to the shoulder 11 and to the base 12.

The second upper hole 29 is the one from which it is possible to act on a mechanism for moving the foot 27 for adjusting the height.

In this way, through the holes 28,29, it is possible to actuate the connection group and the leveling group of the front-foot unit 15. This is effected, in fact, in the front-foot unit 15 directly from the front part of the furniture with a simple tool.

In the rear foot unit 16, on the other hand, the actuation of both the blocking grub screw 30 or constraining elements and the movement mechanism of the leg 27 is effected indirectly.

For this purpose, a second body 31 is arranged adjacent to the first front foot unit 15, associated with the base 12, for example by means of a pair of snap plugs 19 (so-called "double") or press-fit plugs in holes 32 in the base 12 of the furniture.

The second body 31, also for example having a prismatic shape, has two overlapping pass-through holes 33,34 positioned one above the other.

The first hole 34, above the other hole 33, is the one from which it is possible to act, through an actuation or transmission rod 35, on a blocking grub screw 30 or constraining elements of the rear foot unit 16 for blocking the body 17 to the shoulder 11 and base 12.

The second lower hole 33 is the one from which it is possible to act by means of a further actuation or transmission rod 36 on a mechanism for moving the leg 27 of the rear foot unit 16 for height adjustment.

The FIGURE shows how the body 31 in the example shown is separate from the first front foot unit 15 but in a further embodiment it can be all in one piece with the body 17 of the first front foot unit 15 itself.

In both cases, the actuation or transmission rods 35,36 can be actuate from a convenient frontal position next to the actuation position of the first front foot unit 15 in correspondence with the ends 37,38 of the rods 35,36. A front end 37,38 of the actuation or transmission rods 35,36 is in fact arranged in both cases adjacent to actuation holes 28,29 of the body 17 containing said connection group and levelling group of said at least one front foot unit 15.

The functioning of the joining and levelling system for parts of furniture and furniture items described above is simple and can be easily understood from what is indicated and shown in the accompanying drawings.

Said joining and levelling system for parts of furniture and furnishing items according to the invention allows there to be no visible hole, once it has been correctly mounted for connecting and levelling the furniture.

It is fixed to the bottom of the piece of furniture and allows its actuation frontally with respect to the furniture through the space between the bottom or base and the floor even when the space between the base and the floor is extremely limited.

It should also be noted that in a system of this type according to the invention, each front foot unit 15 and each rear foot unit 16 contains both the connection or joining group with relative blocking and also the levelling group under the thickness of the front base or shelf or bottom of the furniture.

According to the invention, any actuation drawback is eliminated as it is possible to act both in connection and above all in levelling from the front part of the furniture without any visible hole in the furniture itself.

And above all this is the case for both each front foot unit 15 and each rear foot unit 16 present in the furniture.

Once said joining and levelling system for parts of furniture and furnishing items has been correctly mounted for connecting and levelling the furniture, it confers a high aesthetic and functional characteristic to the furniture.

This provision also allows any further element which serves to ensure the correct direction or orientation of the screwdriver that must be present in the additional known systems in the form of a guide or the like fixed to the bottom of the furniture, to be eliminated.

The objectives mentioned in the preamble of the description have thus been achieved.

The protection scope of the present invention is defined by the enclosed claims.

The invention claimed is:

1. A joining and leveling system for parts of furniture and a furnishing item comprising a bottom or base and a shoulder, comprising:
    a front foot unit; and
    a rear foot unit,
    wherein the front and the rear foot unit each comprises a maneuverable connection group with a constraining element and a leveling group with a height adjustment mechanism,
    wherein both said maneuverable connection group and said leveling group of said front foot and rear foot units are actuated from a front with respect to the furniture or furnishing item through a space between the bottom or base and a floor, and
    wherein, in said joining and leveling system, said connection group and said leveling group of said rear foot unit are actuated from the front with actuation or transmission rods having front ends positioned adjacent to actuation holes of said connection group and said leveling group of said front foot unit.

2. The system according to claim 1, wherein said front ends of said actuation or transmission rods are positioned in two pass-through holes of a body adjacent to the front foot unit.

3. The system according to claim 1, wherein said front ends of said actuation or transmission rods are positioned in two pass-through holes of a body also formed in said front foot unit.

4. The system according to claim 1, wherein said front foot unit and said rear foot unit each comprise a body that houses said connection group and said levelling group.

5. The system according to claim 1, wherein said front foot unit and said rear foot unit each have the actuation holes that are two overlapping holes, from which the actuation of said connection group and said levelling group is respectively effected.

6. The system according claim 1, wherein a body of said front foot unit and said rear foot unit has at least one interlocking plug and at least one snap plug respectively positioned in a hole of said shoulder and at least one hole of said base or bottom.

7. The system according to claim 1, wherein each connection group of both said front foot unit and said rear foot unit comprises a pin and a grub screw that define a blocking system.

* * * * *